US008338330B2

(12) United States Patent
Yang et al.

(10) Patent No.: US 8,338,330 B2
(45) Date of Patent: Dec. 25, 2012

(54) CHEMICAL BRIDGES FOR ENHANCING HYDROGEN STORAGE BY SPILLOVER AND METHODS FOR FORMING THE SAME

(75) Inventors: Ralph T. Yang, Ann Arbor, MI (US); Yingwei Li, Ann Arbor, MI (US); Gongshin Qi, Ann Arbor, MI (US); Anthony J. Lachawiec, Jr., Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1576 days.

(21) Appl. No.: 11/442,898

(22) Filed: May 30, 2006

(65) Prior Publication Data

US 2007/0082816 A1    Apr. 12, 2007

Related U.S. Application Data

(60) Provisional application No. 60/725,337, filed on Oct. 11, 2005, provisional application No. 60/751,744, filed on Dec. 19, 2005.

(51) Int. Cl.
*C01B 31/08* (2006.01)
(52) U.S. Cl. .................................... 502/417; 428/408
(58) Field of Classification Search .................. 502/417; 428/408
See application file for complete search history.

(56) References Cited

U.S. PATENT DOCUMENTS

| | | | | |
|---|---|---|---|---|
| 4,029,567 | A | * | 6/1977 | Farnand et al. ............... 208/426 |
| 4,954,469 | A | * | 9/1990 | Robinson ........................ 502/80 |
| 5,102,745 | A | | 4/1992 | Tatarchuk et al. |
| 5,342,528 | A | * | 8/1994 | Adachi et al. ................. 210/668 |
| 5,965,479 | A | * | 10/1999 | Suzuki et al. ................. 502/182 |
| 6,471,936 | B1 | * | 10/2002 | Chen et al. ................. 423/658.2 |
| 6,596,055 | B2 | | 7/2003 | Cooper et al. |
| 6,930,193 | B2 | | 8/2005 | Yaghi et al. |

OTHER PUBLICATIONS

International Preliminary Report on Patentability for S.N. PCT/US2006/021509 dated Apr. 24, 2008 (5 pages).
Côté, Adrien P. et al., "Porous, Crystalline, Covalent Organic Frameworks," Science, vol. 310, Nov. 18, 2005, pp. 1166-1170.
Dillon, et al., "Storage of Hydrogen in Single-Walled Carbon Nanotubes", Nature, vol. 386, Mar. 27, 1997, pp. 377-379.
Ye, et al., "Hydrogen Adsorption and Cohesive Energy of Single-Walled Carbon Nanotubes", Applied Physics Letters, vol. 74, No. 16, Apr. 19, 1999, pp. 2307-2309.
Wang et al., "Computer Simulations of Hydrogen Adsorption on Graphite Nanofibers", Journal of Physical Chemistry B, vol. 103, No. 2, Jan. 14, 1999, pp. 277-281.
Liu, et al., "Hydrogen Storage in Single-Walled Carbon Nanotubes at Room Temperature", Science, vol. 286, Nov. 5, 1999, pp. 1127-1129.
Chen, et al., "High H2 Uptake by Alkali-Doped Carbon Nanotubes Under Ambient Pressure and Moderate Temperatures", Science, vol. 285, Jul. 2, 1999, pp. 91-93.
Yang, Ralph T., "Hydrogen Storage by Alkali-Doped Carbon Nanotubes—Revisited", Carbon, 38 (2000), pp. 623-626.
Dillon, et al., "Hydrogen Storage Using Carbon Adsorbents: Past, Present and Future", Appl. Phys. A 72 (2001), pp. 133-142.
Tibbetts, et al., "Hydrogen Storage Capacity of Carbon Nanotubes, Filaments, and Vapor-Grown Fibers", Carbon 39 (2001), pp. 2291-2301.
Cheng, et al., "Mechanism of Hydrogen Sorption in Single-Walled Carbon Nanotubes", J. Am. Chem. Soc. 2001, 123, pp. 5845-5846.
Simonyan, et al., "Hydrogen Storage in Carbon Nanotubes and Graphitic Nanofibers", Journal of Alloys and Compounds, 330-332 (2002), pp. 659-665.
Lueking et al., "Hydrogen Spillover From a Metal Oxide Catalyst onto Carbon Nanotubes—Implications for Hydrogen Storage", Journal of Catalysis 206 (2002), pp. 165-168.
Chambers et al., "Hydrogen Storage in Graphite Nanofibers", The Journal of Physical Chemistry B, vol. 102, No. 22, May 28, 1998, pp. 4253-4256.
Ahn et al., "Hydrogen Desorption and Adsorption Measurements on Graphite Nanofibers", Applied Physics Letters, vol. 73, No. 23, Dec. 7, 1998, pp. 3378-3380.
Park et al., "Further Studies of the Interaction of Hydrogen With Graphite Nanofibers", J. Phys. Chem. B, 1999, 103, pp. 10572-10581.
Gupta et al., "Further Studies on Microstructural Characterization and Hydrogenation on Behaviour of Graphite Nanofibers", Intl. J. of Hydrogen Energy 26 (2001), pp. 857-862.
Browning et al., "Studies into the Storage of Hydrogen in Carbon Nanofibers:Proposal of a Possible Reaction Mechanism", Nano Letters 2002, vol. 2, No. 3, pp. 201-205.
Lueking et al., "Hydrogen Storage in Graphite Nanofibers: Effect of Synthesis Catalyst and Pretreatment Conditions", Langmuir 2004, 20, pp. 714-721.
Chahine et al., "Low-Pressure Adsorption Storage of Hydrogen", Intl. J. Hydrogen Energy, vol. 19, No. 2 (1994), pp. 161-164.
Lamari et al., "Thermal Effects in Dynamic Storage of Hydrogen by Adsorption", Environmental and Energy Engineering, vol. 46, No. 3, Mar. 2000, pp. 632-646.
Orimo et al., "Hydrogen in the Mechanically Prepared Nanostructured Graphite", Applied Physics Letters, vol. 75, No. 20, Nov. 15, 1999, pp. 3093-3095.
Yang et al., "Ab Initio Molecular Orbital Study of Adsorption of Atomic Hydrogen on Graphite: Insight into Hydrogen Storage in Carbon Nanutubes", Carbon 40 (2002), pp. 437-444.

(Continued)

*Primary Examiner* — Stuart Hendrickson
(74) *Attorney, Agent, or Firm* — Dierker & Associates, P.C.

(57) ABSTRACT

A composition for hydrogen storage includes a source of hydrogen atoms, a receptor, and a chemical bridge formed between the source and the receptor. The chemical bridge is formed from a precursor material. The receptor is adapted to receive hydrogen spillover from the source.

19 Claims, 5 Drawing Sheets

OTHER PUBLICATIONS

Khoobiar, S.,"Particle to Particle Migration of Hydrogen Atoms on Platinum-Alumina Catalysts From Particle to Neighboring Particles",Notes,vol. 68,No. 2, Feb. 1964, pp. 411-412.

Sinfelt et al., "Kinetic Evidence for the Migration of Reactive Intermediates in Surface Catalysis",Migration of Intermediates in Surface Catalysis,Nov. 5, 1963, pp. 3365-3367.

Connor, Jr. et al., "Spillover in Heterogeneous Catalysis", Chem. Rev. 1995, 95, pp. 759-788.

Srinivas et al.,"Direct Observation of Hydrogen Spillover on Carbon-Supported Platinum and Its Influence on the Hydrogenation of Benzene",J. of Catalysis 148,(1994),pp. 470-477.

Lueking et al., "Hydrogen Spillover to Enhance Hydrogen Storage—Study of the Effect of Carbon Physicochemical Properties", Appl. Catalysis A: General 265 (2004), pp. 259-268.

Boudart, et al., "On the Slow Uptake of Hydrogen by Platinized Carbon", Journal of Catalysis 18 (1970), pp. 46-51.

Levy et al., "The Kinetics and Mechanism of Spillover", Journal of Catalysis 32 (1974), pp. 304-314.

Cassell, et al., "Large Scale CVD Synthesis of Single-Walled Carbon Nanotubes", J. Phys. Chem. B 1999, 103, pp. 6484-6492.

Goodell, P.D., "Stability of Rechargeable Hydriding Alloys During Extended Cycling", Journal of the Less-Common Metals, 99 (1984), pp. 1-14.

Zhou, et al., "Linearization of Adsorption Isotherms for High-Pressure Applications", Chemical Engineering Science, vol. 53, No. 14 (1998), pp. 2531-2536.

Benson et al.; "Hydrogen-Oxygen Titration Method for the Measurement of Supported Platinum Surface Areas", Journal of Catalysis 4 (1965), pp. 704-710.

Li, et al., "Hydrogen Storage in Metal—Organic Frameworks by Bridged Hydrogen Spillover", J. Am. Chem. Soc., Published on Web Jun. 2, 2006.

Yang et al., "Adsorption of Spillover Hydrogen Atoms on Single-Wall Carbon Nanotubes", J. Phys. Chem. B, Published on Web Mar. 2, 2006 , 110, pp. 6236-6244.

International Search Report for S.N. PCT/US2006/021509 dated Oct. 5, 2007 (3 pages).

* cited by examiner

CHEMICAL BRIDGES FOR ENHANCING HYDROGEN STORAGE BY SPILLOVER AND METHODS FOR FORMING THE SAME

CROSS REFERENCE TO RELATED APPLICATIONS

This application claims the benefit of U.S. Provisional Patent Application Ser. No. 60/725,337 filed on Oct. 11, 2005, and U.S. Provisional Patent Application Ser. No. 60/751,744 filed on Dec. 19, 2005.

STATEMENT REGARDING FEDERALLY SPONSORED RESEARCH OR DEVELOPMENT

This invention was made in the course of research partially supported by a grant from the U.S. Department of Energy Grant No. DE-FC36-05-GO15078. The U.S. government has certain rights in the invention.

BACKGROUND

The present disclosure relates generally to hydrogen storage, and more particularly to compositions for hydrogen storage.

The U.S. Department of Energy (DOE) has established a multi-stage target for hydrogen storage capacity in materials, for example, those materials intended for fuel cell applications. The targets for on-board hydrogen storage materials are about 1.5 kW/kg (4.5 wt %) by 2007, about 2 kW/kg (6 wt %) by 2010, and about 3 kW/kg (9 wt %) by 2015.

In attempts to meet the DOE targets, nanostructured carbon materials (e.g. carbon nanotubes, graphite nanofibers, activated carbon, and graphite) have become of interest to researchers as potential hydrogen adsorbents. However, it has been shown that nanostructured carbons (in particular, carbon nanotubes) have slow uptake, irreversibly adsorbed species, and the presence of reduced transition metals.

Experimental evidence, combined with ab initio molecular orbital calculations of hydrogen atoms on graphite, has led to the proposal of a mechanism for hydrogen storage in carbon nanostructures involving hydrogen dissociation on metal particles followed by atomic hydrogen spillover and adsorption on the nanostructured carbon surface. Hydrogen spillover was first postulated in the early 1960s, and despite continued investigations and research to support the theory, the mechanistic details of hydrogen spillover are still poorly understood.

As such, it would be desirable to provide a nanostructured carbon material incorporating hydrogen spillover and having increased hydrogen storage capacity.

SUMMARY

A composition for hydrogen storage is disclosed. The composition includes a source of hydrogen atoms and a receptor that is adapted to receive hydrogen spillover from the source. A chemical bridge is formed from a precursor material, and is formed between the source of hydrogen atoms and the receptor.

BRIEF DESCRIPTION OF THE DRAWINGS

Features and advantages of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION

Embodiments of the composition disclosed herein advantageously increase hydrogen storage capacity in nanostructured carbon materials. It is believed that the hydrogen storage capacities may advantageously be in excess of 6 wt. % at room temperature. Without being bound to any theory, it is believed that chemical bridges and contacts serve to substantially improve contact between a spillover source and a receptor, and between a spillover source and a support, respectively.

Figure 1:
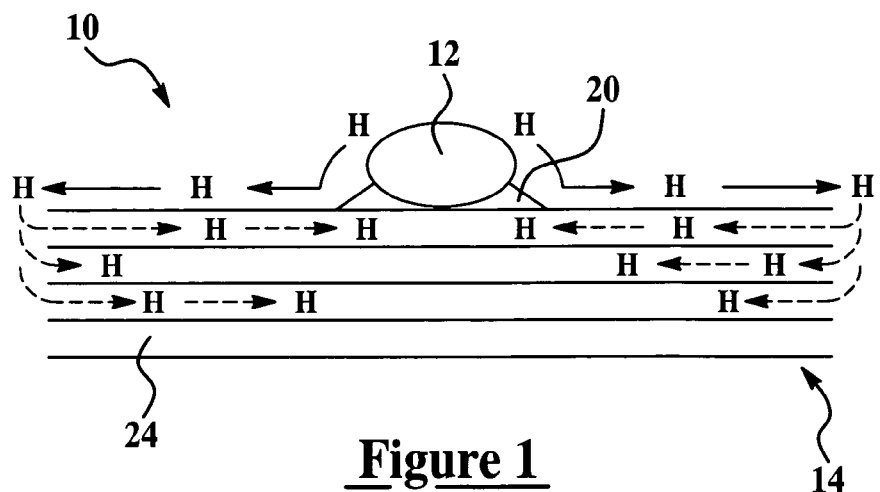
FIG. 1 is a schematic diagram depicting the spillover process in an embodiment of the composition.

Referring now to FIG. 1, an embodiment of the composition 10 is illustrated. The composition includes a source of hydrogen atoms 12 and a receptor 14. In this embodiment, the source of hydrogen atoms 12 includes metal doped on a surface of the receptor 14. Non-limitative examples of metals that may be doped on the receptor 14 surface include platinum, palladium, ruthenium, rhodium, nickel, copper, iron, or the like, or combinations thereof.

It is to be understood that the doped metal may serve as the source 12 of hydrogen atoms via dissociation. In this case, the transport of hydrogen atoms from the metal to the receptor 14 is referred to as primary spillover.

The receptor 14 is adapted to receive hydrogen atoms that spill over from the source 12. In an embodiment, the receptor 14 may be any suitable porous and/or microporous material, including activated carbons, super-activated carbon, carbon nanotubes (a non-limitative example of which includes single-wall carbon nanotubes (SWNT)), carbon nanofibers, molecular sieves, silica gel, alumina, zeolites, metal-organic framework (MOF) materials (described further in reference to FIG. 3), covalent organic framework (COF) materials; and combinations thereof. A non-limitative embodiment of super-activated carbon includes AX-21 super-activated carbon, which is commercially available from Anderson Development Co. located in Adrian, Mich. In a non-limitative embodiment, the zeolites are selected from zeolite X, zeolite Y, zeolite LSX, MCM-41 zeolites, silicoaluminophosphates (SAPOs), and combinations thereof.

Chemical bridges 20 may be formed between the source 12 and the receptor 14. In the embodiment shown in FIG. 1, the chemical bridges 20 are generally formed at the interstices between the source 12 and the receptor 14. Without being bound to any theory, it is believed that the chemical bridges 20 may enhance the hydrogen adsorption amount by a factor ranging from about 1.5 to about 10.0 at 298 K and at 100 kPa or at 10 MPa, depending, at least in part, on the receptor 14 selected. Furthermore, while the Examples below pertain to the formation of carbon bridges, without being bound to any theory, it is believed that similar hydrogen adsorption results may be obtained with boron bridges, phosphorus bridges, sulfur bridges, and/or combinations thereof.

In an embodiment of a method of forming composition 10, the source 12 and the receptor 14 are added together to form a mixture of the components. A chemical bridge 20 is formed between the source 12 and the receptor 14. In an embodiment, a hydrocarbon, carbon, boron, phosphorus, sulfur, and/or compounds thereof, and/or combinations thereof (e.g., carbon/boron) precursor material is added to the mixture of the source 12 and receptor 14. It is to be understood that the precursor material may be in a solid form, a liquid form, or combinations thereof, as desired and/or as suitable for a particular application. In one non-limitative example, the precursor material is a solid at room temperature, examples of which include, but are not limited to sugars (non-limitative examples of which include reagent grade D-glucose, dextrose, and sucrose), polymers (a non-limitative example of which includes polystyrenes, polyvinyl alcohol, or the like), surfactants, cellulosic resins (such as ethylcellulose resin, urea-formaldehyde resin, etc.), and/or the like, and/or combinations thereof. In a further non-limitative embodiment, the precursor is a liquid, an example of which includes, but is not limited to coal tar pitch and petroleum based pitch.

The source 12/receptor 14/precursor mixture may be heated using a programmed temperature change process. The temperature program may be dependent upon the precursor used. In an embodiment incorporating a precursor material that is solid at room temperature, heating may be accomplished at a temperature greater than the melting temperature of the solid precursor. Certain temperatures melt the precursor so that it substantially fills the interstices between the source 12 and the receptor 14. Increased temperatures (i.e., higher than the melt temperature) at least partially convert (i.e., carbonize, boronize, phosphorize, sulfurize, or combinations thereof) the precursor to a predetermined element by pyrolysis to form the chemical bridges 20. In a non-limitative example using glucose as the precursor, the melting temperature is about 160° C., and the increased temperature (e.g., the carbonization temperature) is about 400° C.

In an embodiment incorporating a liquid precursor material, the method may include heating the mixture to a predetermined temperature (e.g., similar to the increased temperatures previously described) that is sufficient to subject the precursor material to at least partial: carbonization; boronization; phosphorization; sulfurization; or combinations thereof.

It is to be understood that the increased temperatures may partially or substantially fully convert the precursor to carbon, boron, phosphorus, sulfur, and/or compounds thereof, and/or combinations thereof (depending, at least in part, on the precursor selected). As such, the resulting chemical bridge 20 may be partially or substantially fully carbonized, boronized, phosphorized, sulfurized, and/or combinations thereof.

Figure 2:
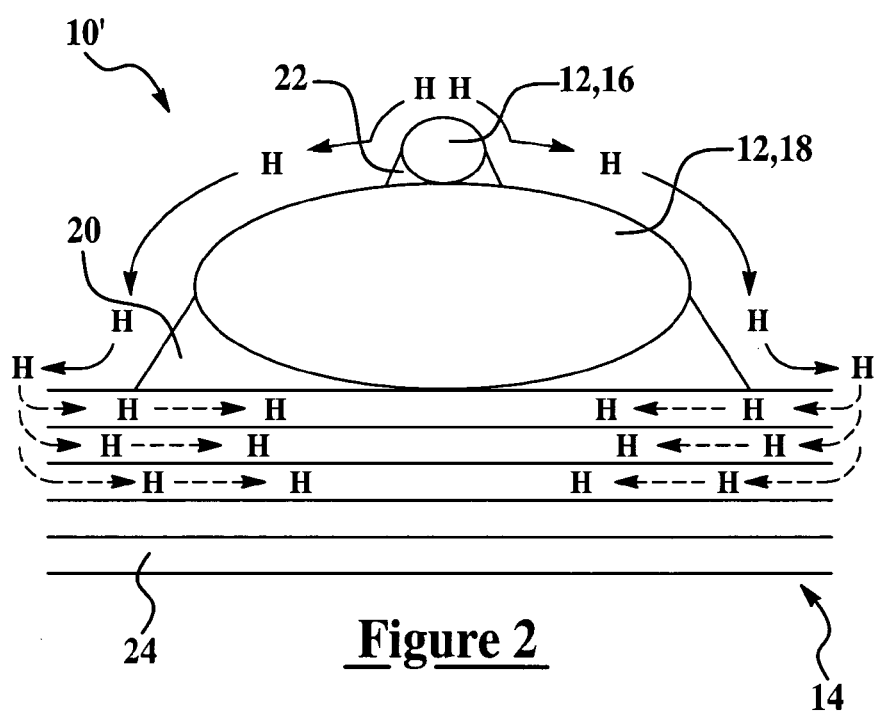
FIG. 2 is a schematic diagram depicting the spillover process in another embodiment of the composition.

Referring now to FIG. 2, another embodiment of the composition 10' is illustrated. The composition 10', like the composition 10 shown in FIG. 1, includes a source of hydrogen atoms 12 and a receptor 14. In this embodiment, however, the source of hydrogen atoms 12 includes a supported catalyst formed from a catalyst 16 supported by a support 18. Generally, the catalyst 16 is capable of dissociating hydrogen from the gas phase. In an embodiment, the catalyst 16 may be formed of transition or noble metals (non-limitative examples of which include Pt, Pd, Ru, Rh, Ni, Co, Fe, or the like, or combinations thereof), or hydrogenation catalysts that are capable of dissociating hydrogen (a non-limitative example of which includes copper chromate). Any high surface area porous material may be used as the support 18 (non-limitative examples of which include activated carbon, carbon nanotubes, carbon nanofibers, activated alumina, silica gel, clays, metal oxides, molecular sieves, zeolites, or the like, or combinations thereof).

It is to be understood that the supported catalyst may serve as the source 12 of hydrogen atoms via dissociation. Generally, if the source 12 of atomic hydrogen is a dissociating catalyst 16 on a low capacity support 18, hydrogen adsorption may be increased by adding a high capacity receptor 14. In this case, the transport of hydrogen atoms from the catalyst 16 to the support 18 is referred to as primary spillover, and the transport of hydrogen atoms from the support 18 to the receptor 14 is referred to as secondary spillover.

As previously described, the receptor 14 is adapted to receive hydrogen atoms that spill over from the source 12. In an embodiment, the receptor 14 may be any of the previously described porous and/or microporous materials.

Similar to the embodiment shown in FIG. 1, chemical bridges 20 may be formed between the source 12 and the receptor 14. In this embodiment, the chemical bridges 20 are generally formed at the interstices between the support 18 of the source 12 and the receptor 14. As previously stated, it is believed that the chemical bridges 20 may enhance the hydrogen adsorption amount by a factor ranging from about 1.5 to about 10.0 at 298 K and at 100 kPa or at 10 MPa, depending, at least in part, on the receptor 14 selected.

The method of forming composition 10' is similar to the method of forming composition 10, shown in FIG. 1. To form composition 10', however, the source 12, which is mixed with the receptor 14, includes both the catalyst 16 and the support 18. Chemical bridges 20 are formed between the support 18 of the source 12 and the receptor 14. In an embodiment of the method, the previously described precursor material(s) is/are added to the mixture of the source 12 and receptor 14. The source 12/receptor 14/precursor mixture may be heated using a programmed temperature change process, as described hereinabove. When certain temperatures are reached during the process, the precursor is melted so that it substantially fills the interstices between the source 12 and the receptor 14. As described hereinabove in reference to FIG. 1, the increased temperatures carbonize, boronize, phosphorize, sulfurize, or combinations thereof (i.e. at least partially convert the fluid to carbon, boron, phosphorus, sulfur, or combinations thereof by pyrolysis) the precursor to form the chemical bridges 20.

In an embodiment of forming the composition 10', chemical contacts 22 may also form between the catalyst 16 and the support 18 to enhance primary spillover. It is to be understood that the chemical contacts 22 may be formed in the same manner and at substantially the same time as the chemical bridges 20.

It is to be understood that the composition 10, 10' may be substantially fully reversible through desorption and re-adsorption at about 298 K. Without being bound to any theory, it is believed that the release of hydrogen at room temperature is possible because the bond energy is low enough to desorb. In an embodiment, desorption at 298 K may take place in a vacuum (about 1 Pa) for a predetermined time (e.g., a time ranging from about 1 minute to about 10 hours). It is to be understood that the predetermined time may depend, at least in part, on the amount of hydrogen to be desorped. In another embodiment, desorption may be accomplished by heating the composition 10, 10' at a temperature ranging from about 298 K to about 423 K.

Without being bound to any theory, it is believed that molecular hydrogen may also be desorbed from the receptor 14 of the composition 10, 10' upon depressurization. In this embodiment, it is believed that hydrogen atoms on the interior sites of the receptor 14 desorb first. The binding energies on these interior sites are relatively low (e.g., on the order of 10-15 kcal/mol), and the adsorbed hydrogen atoms are mobile. As such, an interior-exterior exchange is possible, and the interior sites substantially continuously serve as the sites to which hydrogen atoms migrate and from which hydrogen is desorbed as molecular hydrogen. It is further believed that when the catalyst 16 is present, the bond energy of hydrogen on the catalyst 16 may be low (e.g., 18 kcal/mol for $H_2$ on Pt). For such a system, desorption by reverse spillover may be possible where the catalyst 16 surface serves as the desorption site. Through such desorption paths, reversibility of hydrogen adsorption (and desorption) may occur. Such desorption (and generally the adsorption of spillover hydrogen) is further discussed in "Adsorption of Spillover Hydrogen Atoms on Single-Wall Cabon Nanotubes" by Yang et al., published on Mar. 30, 2006 in the *Journal of Physical Chemistry B*, 110 (12), at pages 6236-6244.

FIGS. 1 and 2 also depict the spillover process in the composition 10, 10'. Dissociation of the hydrogen atoms (as indicated by H) takes place on the source 12 (e.g., metal doped on the surface of receptor 14 (see FIG. 1), or catalyst 16 (see FIG. 2)) and atomic hydrogen spills over ultimately to the receptor 14.

In FIG. 1, the atoms are transported to the receptor 14 via diffusion across the bridges 20, and may then access additional sites 24 on the receptor 14. In this embodiment, it is believed that the chemical bridges 20 enhance primary spillover and thus, storage capacity of composition 10.

In FIG. 2, the atoms are transported to the support 18 via diffusion across the contacts 22, and then are transported to the receptor 14 via diffusion across the bridges 20. The atoms are then able to access additional sites 24 on the receptor 14.

Without being bound to any theory, it is believed that secondary hydrogen spillover is enhanced by the chemical bridges 20. Furthermore, it is believed that the creation of intimate contacts 22 between the catalyst 16 and the support 18 may also contribute to primary spillover enhancement. Increased primary and secondary spillover increases the storage capacity of the composition 10'.

Figure 3:
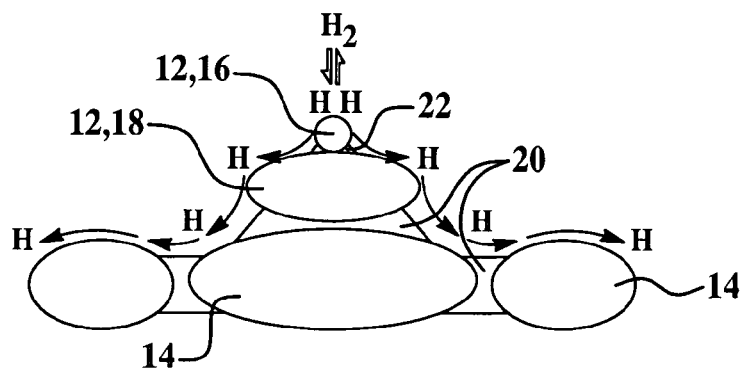
FIG. 3 is a schematic diagram depicting the spillover process in an embodiment of the composition using a metal-organic framework (MOF) receptor.

Referring now to FIG. 3, a specific non-limiting embodiment of the composition 10' is depicted. This embodiment incorporates a metal-organic framework (MOF) as the receptor 14. Non-limiting examples of such metal-organic frameworks include MOF-5, MOF-8 (the terms "MOF-8" and "IRMOF-8" (iso-reticular MOF-8) are used interchangeably herein), IRMOF-177, and/or the like, and/or combinations thereof, which are constructed by linking tetrahedral clusters with linear carboxylates.

In an alternate embodiment, it is to be understood that porous, crystalline, covalent organic framework (COF) materials may be used as the receptor 14. COFs are formed from light elements (e.g., H, B, C, N, and O) that form strong covalent bonds in materials such as diamond, graphite, and boron nitride. COFs may be micro- and mesoporous crystalline structures. These COF materials have substantially rigid structures, excellent thermal stabilities (to temperatures up to about 600° C.), and relatively low densities. Further, these materials exhibit permanent porosity with specific surface areas substantially surpassing those of well-known zeolites and porous silicates. Yet further, it has been found that COF materials generally do not adsorb water vapor, and thus may be more stable than MOF materials when used as the receptor 14 in embodiment(s) of the present disclosure. In a non-limitative embodiment, the COF materials are selected from COF-1 $[(C_3H_2BO)_6.(C_9H_{12})_1]$, COF-5 $(C_9H_4BO_2)$, and combinations thereof. The synthesis and crystallization of suitable COF materials is described by Côté et al., "Porous, Crystalline, Covalent Organic Frameworks," *Science*, Vol. 310, pages 1166-1170 (Nov. 18, 2005).

Using an embodiment of the method as disclosed herein, chemical bridges 20 are formed between the support 18 and the MOF receptor 14. Many metal-organic frameworks are thermally unstable at temperatures greater than about 573 K. As such, the highest temperature used for constructing the chemical bridges 20 between the support 18 and a MOF receptor 14 is below the collapsing temperatures of MOF. It is believed that this substantially prevents the initiation of decomposition of the MOF material. In an embodiment, sucrose may be used as the precursor, and an effective temperature program may be employed for building the chemical bridges 20, while at the same time, protecting the MOF crystals from collapsing.

It is believed that the chemical bridges 20 substantially enhance secondary spillover, or the migration of hydrogen atoms from the source 12/support 18 to the receptor 14. It is also believed that the bridges 20 enhance the hydrogen uptake of the receptor 14. In a non-limiting example, the storage capacity of a MOF-8 receptor 14 is about 4 wt. % at 298 K and 10 Mpa, which is about eight times the storage capacity of pure MOF-8 under the same conditions.

To further illustrate embodiment(s) of the present disclosure, various examples are given herein. It is to be understood that these examples are provided for illustrative purposes and are not to be construed as limiting the scope of the disclosed embodiment(s).

EXAMPLES

Experimental Details
AX-21 Super-Activated Carbon and Single-Wall Carbon Nanotube Receptors
Preparation of Samples The source of hydrogen atoms for spillover was a catalyst consisting of 5 wt % palladium supported on active carbon. The spillover receptors were AX-21 super-activated carbon and single walled carbon nanotubes (SWNT). The estimated BET surface area of the AX-21 carbon was 2880 m$^2$/g with a median slit pore size of about 14 Å, as measured by the Horvath-Kawazoe method. The BET surface area values for microporous materials may be overestimated since micropores are generally filled with nitrogen below the traditional relative pressure range that is valid for BET estimation (relative pressures from 0.05 to 0.3).

The SWNTs were prepared by catalytic decomposition of methane on an iron catalyst supported on a hybrid alumina-silica support. The SWNTs were purified using washes of hydrofluoric, nitric, and sulfuric acids to remove the catalyst and support. Treatment in hydrofluoric acid (about 48 wt % in water) was performed at room temperature for about 24 hours with stirring. The SWNTs were filtered and rinsed with deionized water, and were treated three times with nitric acid (about 70 vol % in water) at about 353 K, with stirring, for about 1 hour. Between each nitric acid treatment, the SWNTs were filtered and rinsed with deionized water. The temperature and agitation conditions were the same for the final treatment, which included concentrated sulfuric acid (about 95.9 vol % in water) and was performed for about 30 minutes. The SWNTs were dried in an oven at about 373 K overnight.

An ash content analysis (under the suggested conditions of ASTM D 2866-94) was performed to confirm that the SWNTs contained less than 1.0 wt % metal catalyst after purification. The purified SWNTs had an estimated BET surface area of about 820 m$^2$/g with an average cylindrical pore size of 12 Å.

In order to determine the enhancing effect of carbon bridges on secondary spillover, hydrogen adsorption measurements on the source, receptors, and physical mixtures of the components were used as a baseline. The source and receptors were ground together for about 30 minutes to produce the physical mixtures. The ratio of receptor to source was fixed at about 9:1. After grinding, the mixtures were transferred to a quartz tube furnace where they were calcined in flowing helium at about 673 K for about 2 hours. The samples were stored for subsequent pretreatment and hydrogen adsorption measurements.

Carbon bridges between the source and receptor were formed with the addition of a hydrocarbon precursor to a physical mixture of the components. The hydrocarbon precursor used was reagent grade D-glucose. The receptor/precursor/source ratio was fixed at about 8:1:1 based on the complete carbonization of the precursor. As such, the formation of the bridges altered the amount of receptor (but not source) compared to the simple physical mixture. The receptor/source physical mixture was ground with the precursor for about 30 minutes. This material was transferred to a tubular reactor and heated in flowing helium with a temperature program designed to first melt the precursor and allow it to fill the interstices between the source and receptor and then substantially fully carbonize the precursor to form the bridges.

For the D-glucose precursor, the temperature was increased at 1 K/min to 453 K (just above the melting point, 426 K) and held for about 3 hours. This allowed the glucose to melt thoroughly and to wet and fill the crevices between the receptor and the catalyst particles. In the carbonization step, the temperature was increased at 1 K/min to 673 K and held for about 6 hours. The material was cooled to room temperature in helium and stored for further pretreatment and hydrogen adsorption measurements.

Hydrogen Isotherm Measurements

Hydrogen adsorption at pressures lower than 0.1 MPa (1 atm) was measured with a standard static volumetric technique (Micromeritics ASAP 2010). A sample holder configured to allow in-situ pretreatment in a flowing gas stream was used. Approximately 50-100 mg of sample was used for low-pressure isotherm measurements. The apparatus was calibrated for hydrogen measurements at 298 K using palladium powder.

Hydrogen adsorption at pressures greater than 0.1 MPa and up to 10 MPa was also measured using a static volumetric technique. The non-ideality of hydrogen was accounted for by computing the compressibility factor using second and third virial coefficient correlations. Approximately 300 mg of sample was used for high-pressure isotherm measurements. The apparatus was calibrated at 298 K using LaNi$_5$ powder.

All samples were pretreated in-situ to the measurement apparatus prior to isotherm measurements. The pretreatment conditions included reduction in hydrogen (40 sccm) at about 523 K for about 6 hours, and degassing in vacuum at about 673 K for a minimum of 8 hours. Ultra-high purity hydrogen (99.999%) and helium (99.999%) were used for all pretreatments and measurements. Molecular Sieve 3A purifiers were used on each gas stream to ensure purity was maintained throughout the experiments.

Scanning Electron Microscopy

Samples of AX-21 receptor, SWNT receptors, physical mixtures of the spillover source and the receptors, and the source/AX-21 receptor mixture with carbon bridges were examined using scanning electron microscopy (SEM). A Philips XL30 FEG SEM was used to examine the specimens. The SEM accelerating voltage was about 30 kV. An XEDS detector (EDAX, Inc.) enabled identification of palladium particles on the carbon support by elemental analysis.

Results

Figure 4:
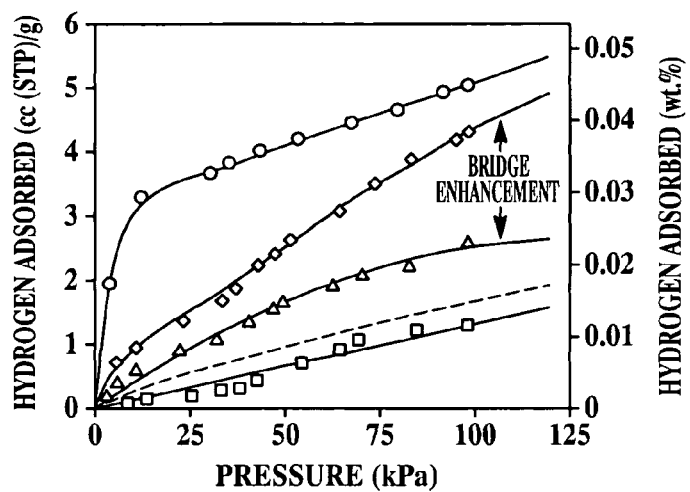
FIG. 4 is a graph depicting low-pressure hydrogen isotherms at 298 K for AX-21 receptors, ○, 5 wt % Pd—C catalyst, ◇, AX-21/Pd—C/Carbon Bridge (8:1:1), ∆, AX-21/Pd—C physical mixture (9:1), □, AX-21, the dotted line is the sum of fractional contributions based on uptake of individual mixture components.
Figure 5:
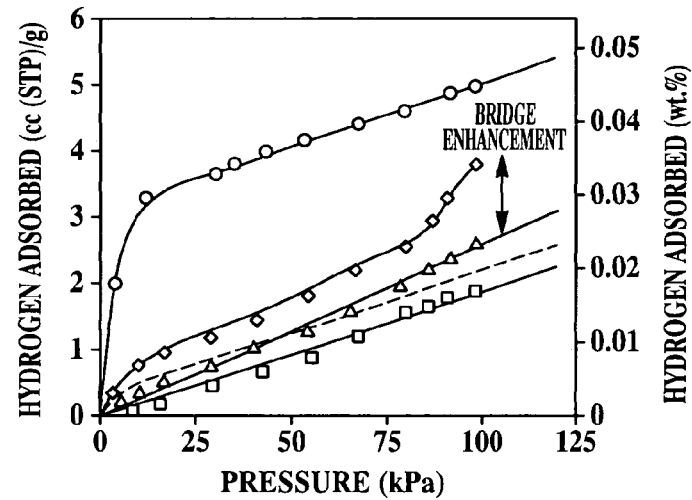
FIG. 5 is a graph depicting low-pressure hydrogen isotherms at 298 K for single-wall carbon nanotube (SWNT) receptors, ○, 5 wt % Pd—C catalyst, ◇, SWNT/Pd—C/Carbon Bridge (8:1:1), ∆, SWNT/Pd—C physical mixture (9:1), □, SWNT, the dotted line is the sum of fractional contributions based on uptake of individual mixture components.

The low-pressure hydrogen adsorption isotherms for AX-21 and SWNT receptors are presented in FIGS. 4 and 5, respectively. The isotherm for the 5 wt % Pd—C catalyst shows the expected behavior of palladium hydride formation for pressures less than 12 kPa. The change in curvature at 12 kPa corresponds to an uptake amount of about 3.2 cc (STP)/g or a hydrogen to metal ratio of 0.65:1, which is in agreement with the sloping upper branches of the isotherm attributed to the palladium hydride beta phase. A second inflection is observed at approximately 90 kPa for the SWNT receptor.

For both receptors, the physical mixture and the bridged material exceed the capacity that is expected if the individual contributions of the source and receptor are considered additive (represented by the dotted line in each plot). The enhancement of hydrogen storage capacity with those embodiments including carbon bridges is evident in the figures, with the AX-21 receptor demonstrating a higher capacity than the SWNT receptor at 100 kPa.

Figure 6:
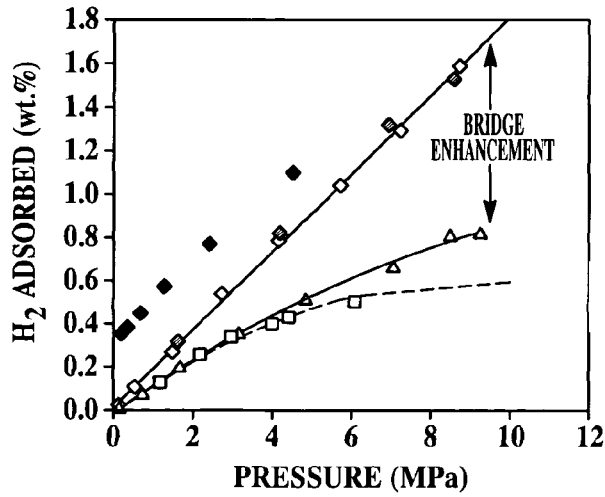
FIG. 6 is a graph depicting high-pressure hydrogen isotherms at 298 K for AX-21 receptors, ◇, AX-21/Pd—C/Carbon Bridge (8:1:1) First Adsorption, ♦, AX-21/Pd—C/Carbon Bridge (8:1:1) Desorption, ♦, AX-21/Pd—C/Carbon Bridge (8:1:1) Second Adsorption, ∆, AX-21/Pd—C physical mixture (9:1), □, AX-21.

The hydrogen adsorption capacity of the AX-21 receptor was studied at high pressures, including pressures up to 10 MPa. FIG. 6 shows the results of the experiments for a physical mixture and a bridged sample. The dashed line is a fit of the experimental data taken from Zhou and Zhou (Zhou, L.; Zhou, Y. Chem. Eng. Sci. 1998, 53, 2531-2536) for unmodified AX-21. As the pressure increases, the enhancement due to bridging becomes evident. Further, there is no apparent saturation value for the bridged sample, even at 10 MPa. The unmodified AX-21 data and physical mixture begin to demonstrate a change in curvature indicative of a saturation limit at pressures greater than approximately 6 MPa. The absolute capacity of the AX-21/Pd—C/Carbon Bridge (8:1:1) material is about 1.8 wt % at 10 MPa. Without being bound to any theory, it is believed that the absence of a saturation value suggests that the capacity of the composition may be further increased via optimization of the bridge-building process.

Hydrogen was desorbed from the AX-21 bridged sample substantially immediately following the first adsorption. As the data in FIG. 6 indicates, there appears to be a hysteresis present. The sample was evacuated to a pressure of about 1 Pa ($7.5 \times 10^{-3}$ Torr) for about 8 hours at 298 K prior to the second adsorption. Data for the second adsorption is shown by the shaded points and is coincident with data from the first adsorption. This indicates that hydrogen adsorption is reversible at 298 K. The reversibility indicates that the strong sites (i.e., sites that form strong bonds with the spillover atomic hydrogen) had been saturated with hydrogen during the sample pretreatment process (523 K in hydrogen followed by 673 K in helium).

Quantifying the spillover enhancement due to the improved contact between the source and receptor may be desirable. One method to evaluate spillover in a supported metal catalyst system is to determine the ratio of atomic hydrogen to surface metal atoms ($H:M_S$) exposed to the adsorbate. It is to be understood that a value exceeding unity indicates that hydrogen is spilling over to the support. A hydrogen titration method of determining catalyst dispersion, which allows computation of surface metal atoms, may be difficult to apply to systems where spillover is occurring. The difficulty potentially arises when attempting to determine the monolayer coverage of hydrogen from a low-pressure isotherm, which may asymptotically approach a larger adsorbed amount or continue to rise as pressure is increased, due, at least in part, to the spillover phenomenon. Spillover may be quantified in systems containing metals that form solid solutions with hydrogen, as the ratio of total adsorbed hydrogen (including that absorbed by the metal) to total metal atoms ($H:M_T$) exceeds the stoichiometric ratio of the hydride.

Primary spillover in the 5 wt % Pd—C system was evaluated from the low-pressure hydrogen adsorption isotherm shown in FIG. 4. For this material, the hydrogen adsorption at 100 kPa was 5.0 cc (STP)/g. This corresponds to a ratio of 0.95 of atomic hydrogen to total metal.

An enhancement factor method was used to compare the secondary hydrogen spillover to the various receptors. In this case, the enhancement factor was defined for all receptors as:

$$\eta = \frac{Q_R}{Q_{R'}} \quad (1)$$

where $Q_R$ denotes the adsorbed amount for the receptor in the presence of a source and $Q_{R'}$ denotes the adsorbed amount for the receptor alone. In order to calculate $Q_R$, two assumptions were made. Hydrogen adsorption was assumed to be an equilibrium process in all samples and the contributions to the composite material from the source and the receptor were assumed to be additive. Mathematically, $$Q_R = Q_T - xQ_S \quad (2)$$

where $Q_S$ is the adsorption amount for the source alone, including any amount absorbed by a metal that forms a solid solution with hydrogen, x is the mole fraction of the source in the mixture, and $Q_T$ is the total amount adsorbed. By this convention, the bridges become part of the receptor, and any adsorption on them contributes to an increase in the enhancement factor. While it may, in some instances, be possible for the bridges to adsorb some hydrogen, it is expected that this contribution is negligible compared to their role as pathways for the diffusion of hydrogen from the source to the receptor.

The adsorption capacity of the source may be altered by the presence of the bridges if significant amounts of micropores are filled with the chemical bridge product (i.e., carbonization product, boronization product, phosphorization product, sulfurization product, etc.), or if the catalyst (e.g., a metal particle) or doped metal is covered with chemical bridge residue. However, since the ratio of source to receptor is low, its overall contribution to the total adsorption amount is also small; therefore, altering the contribution of the source as a consequence of bridge formation is likely inconsequential. If the catalyst or doped metal is covered with excess bridge material, it may reduce the surface area of metal available for dissociation. However, a mild oxidation treatment may be performed to remove the bridge residue, thereby increasing the surface area of the catalyst or doped metal available for dissociation.

Enhancement factors for the physical mixtures and bridged samples are shown in Table 1. Specifically, Table 1 illustrates the spillover enhancement for the AX-21 and SWNT receptors with a 5 wt % Pd—C source at 298 K.

TABLE 1

Spillover enhancement

| SAMPLE | BET SA, $m^2/g$ | Q, cc (STP)/g | $\eta$ | Q, cc (STP)/g | $\eta$ |
|---|---|---|---|---|---|
| | | 100 kPa (1 atm) | | 10 MPa (100 atm) | |
| 5 wt % Pd-C | 940 | 5.0$^a$ | — | — | — |
| SWNT | 820 | 1.8 | — | — | — |
| SWNT/5 wt % Pd-C (9:1) | — | 2.6 | 1.1 | — | — |
| SWNT/5 wt % Pd-C/Bridge (8:1:1) | — | 3.8 | 1.8 | — | — |
| AX-21 | 2880 | 1.3 | — | 66.7 | — |
| AX-21/5 wt % Pd-C (9:1) | — | 2.6 | 1.6 | 92.2 | 1.1 |
| AX-21/5 wt % Pd-C/Bridge (8:1:1) | — | 4.2 | 2.9 | 201 | 2.7 |

$^a$3.2 cc (STP)/g is due to absorption of stoichiometric amount of hydrogen by Pd (PdH$_{0.6}$)

Note that the addition of the 5 wt % Pd—C source results in an enhancement to spillover, irrespective of bridge formation. The AX-21 receptor was studied at 100 kPa and 10 MPa to determine the effect of pressure on the enhancement factor. The results for this microporous carbon and the SWNTs at low-pressure indicate that the enhancement factor is substantially independent of the receptor for physically mixed samples. In the case of the bridged samples, the AX-21 receptor enhancement factor was a factor of 1.6 times larger than the SWNT receptor. This may indicate that atomic hydrogen is accessing more of the available surface area of the AX-21 receptor. The lower enhancement in spillover for SWNTs may indicate that the tube bundles are packed too closely for atomic hydrogen to adsorb appreciably to the exohedral sites.

Based on the similarity in the adsorption amounts for the individual receptors and in enhancement factors for physically mixed samples, it is believed that the most effective bridge building technique may be specific to the receptor.

As previously stated, scanning electron microscopy (SEM) was used to investigate the samples for differences in the contacts between Pd particles and the primary support carbon and the receptor carbon. FIGS. 7A-7G are the SEM images at 30 kV, spot size 5.0.

Figure 7A:
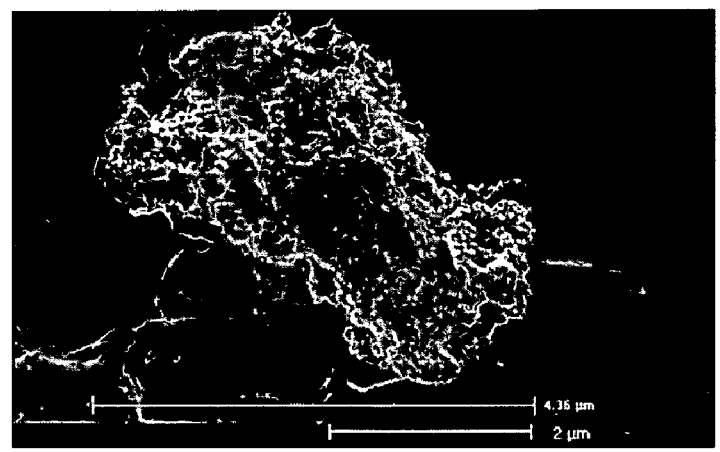
FIGS. 7A-7G are scanning electron microscope (SEM) images at 30 kV, spot size 5.0, (A) Pd particle on carbon, (B) AX-21 receptor, (C) SWNT receptor, about 20-nm tube bundles, (D) Pd particle in AX-21/Pd—C/Carbon Bridge (8:1:1) sample, apparent bridging between source and receptor, (E) Pd particle on Pd—C source in AX-21/Pd—C/Carbon Bridge (8:1:1) sample, intimate contact with support, (F) Pd particle in AX-21/Pd—C (9:1) physical mixture, no bridging apparent, (G) Pd particle on Pd—C source in AX-21/Pd—C (9:1) physical mixture, no contact enhancement.
Figure 7B:
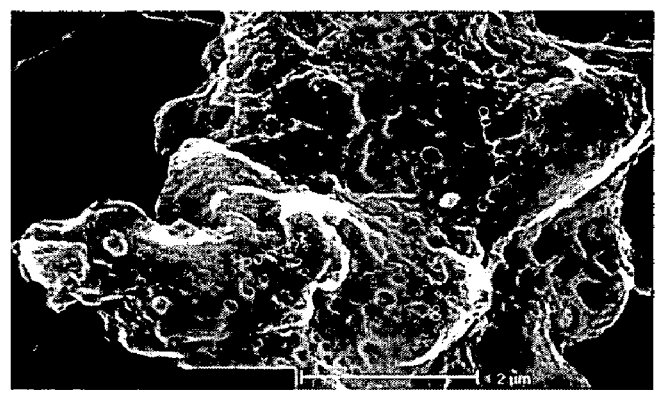
Figure 7C:
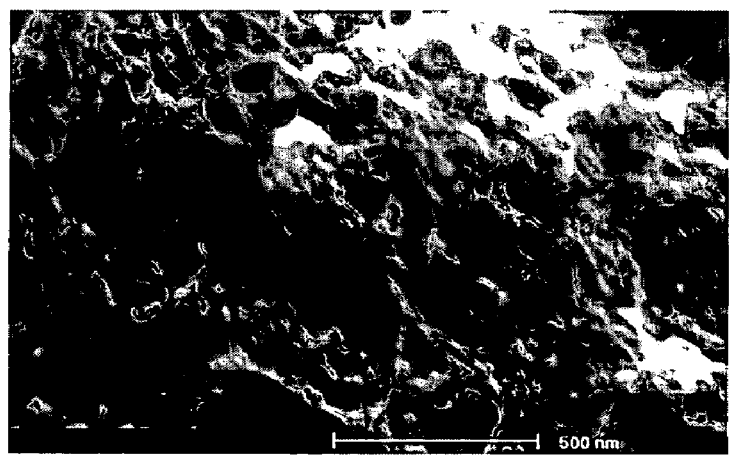

FIG. 7A shows a Pd particle on the surface of the Pd—C commercial catalyst used as the secondary spillover source. The metal particle appears lighter compared to the carbon support. FIGS. 7B and 7C are images of the receptors, AX-21 and SWNTs, respectively. The texture on the surface of the AX-21 particle has pore-like structures ranging from about 100 nm to about 250 nm in diameter. The SWNTs are arranged in bundles (wire-like structures about 20 nm in diameter) in a highly disordered array.

Figure 7D:
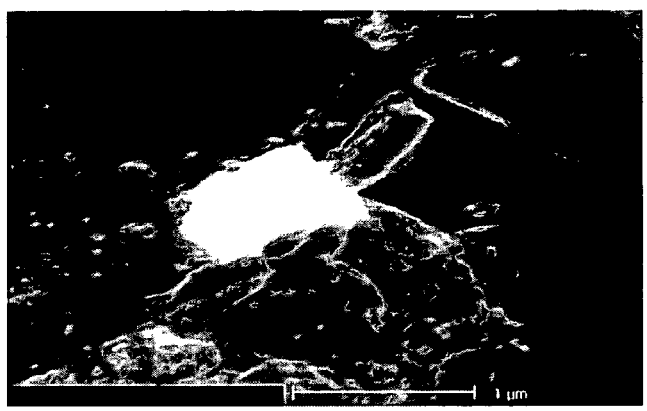
Figure 7E:
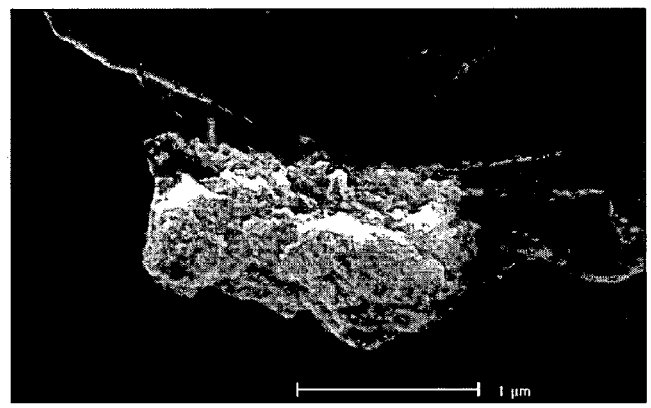

FIGS. 7D and 7E show the AX-21/Pd—C/Carbon Bridge sample. In FIG. 7D, the bright area in the center of the frame is the Pd particle and appears to be contacting two distinct phases, likely the AX-21 receptor and carbon support. The texture of the phase beneath the particle does not appear to match the support or AX-21; thus, it is believed that this is representative of the formed a carbon bridge. FIG. 7E shows a Pd particle in contact with the commercial support. The contact between this particle and the support appears to be quite intimate and seems improved relative to the contact in FIG. 7A. As previously mentioned, the precursor may also have filled the interstices between the support and the Pd particle and contributed to the apparent enhancement in contact shown here.

Figure 7F:
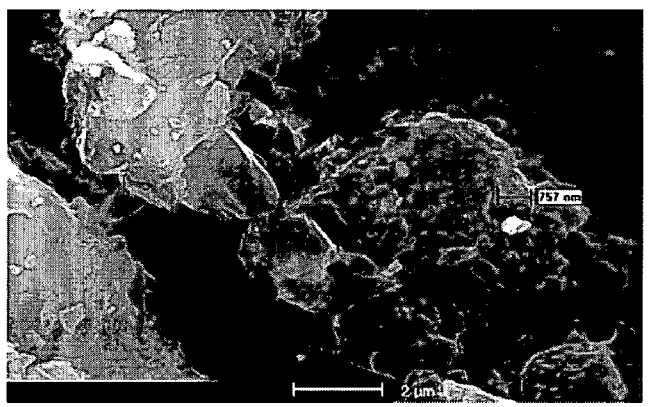
Figure 7G:
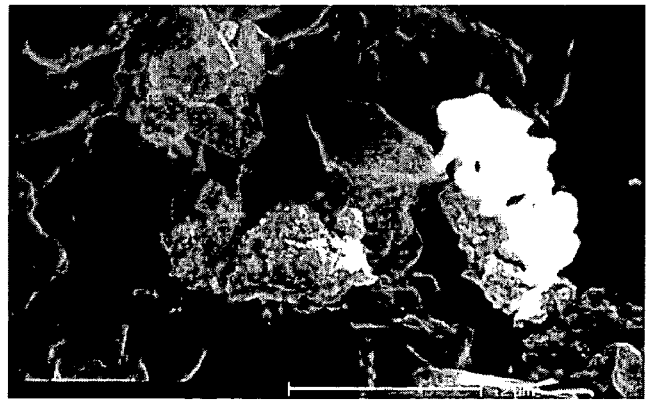

The physical mixture of AX-21/Pd—C (9:1) is shown in FIGS. 7F and 7G. A 760 nm Pd particle is present on the support; however, this support particle does not appear to have improved contact with the surrounding carbon. In FIG. 7G, a Pd particle is shown on the surface of the support carbon with noticeably less intimate contact when compared to FIG. 7E.

MOF-5 and MOF-8 Receptors
Preparation of MOF-5, MOF-8, and Samples

A MOF-5 was synthesized by dissolving 1.19 g of 4 mmol $Zn(NO_3)_2 \cdot 6H_2O$ and 0.34 g of 2 mmol 1,4-benzenedicarboxylic acid in about 40 mL of N,N-dimethylformamide (DMF) during-vigorous stirring at room temperature. Three drops of a 30 wt. % $H_2O_2$ aqueous solution was added to the solution. About 2.3 mL of Triethylamine was added dropwise to the solution under vigorous stirring for about 1 hour, resulting in the formation of a white product. The white product was collected using repeated (e.g., about three times) filtering and thorough washing with DMF. The sample was degassed at room temperature for about 6 hours, heated to about 180° C. at a heating rate of 1° C./min, and held at that temperature for 12 hours under degassing in vacuum.

The preparation of MOF-8 included the same steps as the preparation of MOF-5 described above, except 0.43 g of 2 mmol 2,6-naphtalenedicarboxylic acid was used instead of 1,4-benzenedicarboxylic acid.

200 mg of the MOF-5 (or MOF-8), 25 mg of 5% Pt/AC catalyst, and 35.2 mg of sucrose were ground together for about 1 hour. This mixture was transferred to a quartz boat and placed in a tubular reactor. The mixture was heated in helium flowing at about 100 mL min$^{-1}$ at a heating rate of 1 K min$^{-1}$ to 473 K (Oust above the melting temperature of sucrose, 463 K), and was held at this temperature for about 3 hours. Subsequently, the temperature was increased at 1 K min$^{-1}$ to 523 K and held for about 12 hours. The material was cooled to room temperature at 1 K min$^{-1}$ in helium.

Complete carbonization of sucrose was confirmed by thermogravimetric analysis (TGA) in a separate experiment. Using the same temperature program, the TGA results showed that approximately 20% of the initial sucrose mass remained. The residue was black, and did not lose weight upon heating to 873 K in an inert atmosphere. Therefore, following the above heat treatment procedures, carbon bridges were formed in the interstices between the particles of the metal, the AC support, and the MOF material.

Hydrogen Isotherm Measurements

Figure 8:
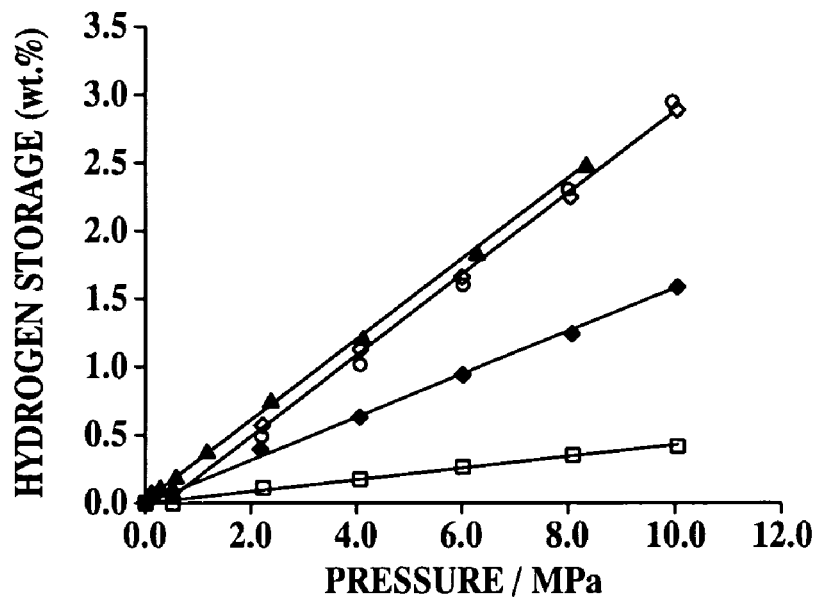
FIG. 8 is a graph depicting high-pressure hydrogen isotherms at 298 K for pure MOF-5 (□), Pt/AC and MOF-5 physical mixture (1:9 weight ratio) (♦), and for bridged sample of Pt/AC-bridges-MOF-5: first adsorption (○), desorption (▲), and second adsorption (◇)

High-pressure $H_2$ adsorption measurements were performed with a specially designed Sievert's apparatus using a static volumetric technique. Prior to taking measurements, 200-300 mg samples were degassed in vacuum at 473 K for about 24 hours. As shown in FIG. 8, MOF-5 had a hydrogen uptake of about 0.4 wt. % at 298 K and 10 MPa. The hydrogen uptake of the MOF-5 was also measured at 77 K (1.3 wt. % at 1 atm).

The hydrogen storage capacity of the MOF-5 and Pt/AC catalyst (at 9:1 weight ratio) mixtures were markedly increased, especially at high pressures (see FIG. 8). The relatively low hydrogen uptake of Pt/AC (1.0 wt. % at 10 MPa), and the small amount of Pt/AC in the mixture (about 10 wt. %), indicate that secondary hydrogen spillover had occurred on the surface of MOF-5.

FIG. 8 illustrates that the bridged sample exhibits the highest hydrogen uptake, about 3 wt. % at 10 MPa. This example illustrates an enhancement factor of about 2 when compared with the physical mixture without carbon bridges. Compared with pure MOF-5, the hydrogen adsorption amount of MOF-5 using hydrogen bridges is enhanced by a factor of about 8. This increase is attributed to secondary spillover of hydrogen atoms from the catalyst to the surface of the MOF material.

Figure 9:
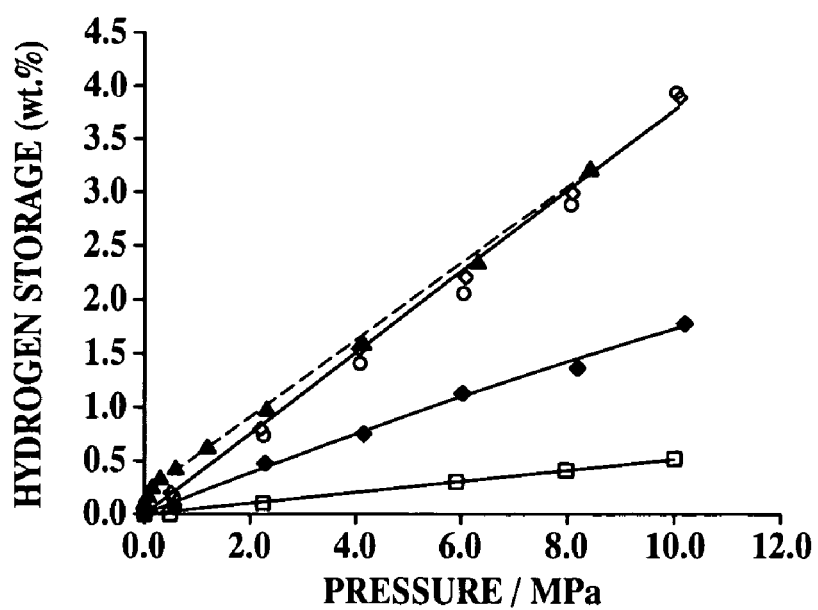
FIG. 9 is a graph depicting high-pressure hydrogen isotherms at 298 K for pure MOF-8 (□), Pt/AC and MOF-8 physical mixture (1:9 weight ratio) (♦), and for bridged sample of Pt/AC-bridges-MOF-8: first adsorption (○), desorption (▲), and second adsorption (◇).

Similar hydrogen storage enhancement was also observed for MOF-8. FIG. 9 summarizes the hydrogen adsorption results of pure MOF-8, a physical mixture, and a bridged sample. The enhancements of hydrogen storage upon spillover and bridge building are illustrated in the figure. The $H_2$ uptake amount in the sample having carbon bridges was increased from about 0.5 wt. % on pure MOF-8 to about 4 wt. % at 10 MPa. The 4 wt. % uptake is equivalent to about 36 H atoms per formula unit $(Zn_4O(C_{12}H_6O_4)_3)$, which is the same as the amount of carbon atoms in the formula unit of MOF-8.

It is possible that zinc oxide units may bind to hydrogen bonding sites. Further, oxygen sites in the organic linkers may also bond hydrogen atoms. As such, the hydrogen uptake shown in FIG. 9 would be well below the saturation capacity of MOF-8. As seen in FIG. 9, no apparent saturation value was approached for the bridged sample, as the isotherm was linear even at 10 MPa. The absence of a saturation value suggests that a further increase in capacity may be expected at pressures greater than about 10 Mpa (e.g., 6 wt. % storage is expected at 15 Mpa), which is a viable pressure for practical automotive applications.

Reversibility

Reversibility was evaluated by measuring the desorption branch down to 1 atm. It can be seen from FIGS. 8 and 9 that the desorption branches almost followed the adsorption branches for the bridged samples, although there appears to be a slight hysteresis. The samples were then evacuated to a pressure of about 1 Pa ($7.5 \times 10^{-3}$ Torr) for about 12 hours at 298 K. As depicted, the second adsorption branches were in complete agreement with the first adsorption branches. These results indicate that hydrogen adsorption in the bridged materials were fully reversible at 298 K.

Kinetics

The adsorption/desorption kinetics of the bridged materials were studied by monitoring the changes in $H_2$ pressure versus time upon each pressure change. The observations indicated that nearly 70% of the total hydrogen capacity was reached in about 1 hour. For desorption, it was observed that over 60% completion was achieved in about 10 minutes upon each pressure drop.

The composition 10 disclosed herein may find broad application with other MOFs and nanostructured materials for hydrogen storage, in part because of the other materials' similarity to MOF-5 and MOF-8 structures. It is believed that the enhancement factor by spillover may be a relatively weak function of the MOF receptor, and that the hydrogen capacity of the pure MOF may be the predominant factor in determining the overall hydrogen uptake via spillover. As such, further increase in capacity may be achieved with other MOF materials having higher hydrogen uptakes than MOF-8 by spillover.

It is to be further understood that alterations to the precursor or the preparation procedure may improve the effectiveness of the receptor 14. For example, the wetting characteristics of the precursor and the receptors 14 may play a role in the efficiency of the bridging. Furthermore, the pretreatment technique after bridging may further enhance the storage capacity. Still further, the mild oxidation procedure to expose more metal surface or remove SWNT caps created by precursor carbonization may add functional groups to the surfaces, which may participate in the spillover process and influence the physisorption of hydrogen. Without being bound to any theory, it is believed that the groups may aggregate with the functionalization created by the oxidative environment used for SWNT purification. Ultrasonication of carbon may be an alternative to oxidation for opening SWNT ends, and may enhance spillover by inducing defects on the surface.

Chemical bridge building may substantially enhance hydrogen spillover and increase storage capacity in embodiments of the composition 10. While physical mixtures of a primary spillover source 12 and a secondary receptor 14 demonstrate modest capacity increases, adding a bridge 20 to improve the contact between the components 12, 14 serves to double or triple the storage capacity. The measured capacity of 1.8 wt % at 298 K and 10 MPa for an AX-21/Pd—C/Carbon Bridge (8:1:1) composite is demonstrative of the increase in storage capacity for embodiments disclosed herein.

While several embodiments have been described in detail, it will be apparent to those skilled in the art that the disclosed embodiments may be modified. Therefore, the foregoing description is to be considered exemplary rather than limiting.

What is claimed is:

1. A composition for hydrogen storage, comprising:
    a transition metal supported on an activated carbon support, the transition metal supported on the activated carbon support serving as a source of hydrogen atoms via dissociation of hydrogen from the gas phase into the hydrogen atoms;
    an activated carbon receptor adapted to receive hydrogen atoms that spill over from the source; and
    a carbon bridge formed between the transition metal supported on the activated carbon and the activated carbon receptor, the carbon bridge formed from a precursor material via pyrolysis;
    wherein the transition metal is chosen from platinum, palladium, ruthenium, rhodium, nickel, copper, iron, and combinations thereof.

2. The composition as defined in claim 1 wherein a chemical contact bridges the transition metal and the activated carbon support.

3. The composition as defined in claim 1 wherein the carbon bridge is formed between the activated carbon support of the source of hydrogen atoms and the activated carbon receptor.

4. The composition as defined in claim 1 wherein the carbon bridge precursor material is selected from sugars, polymers, surfactants, cellulosic resins, coal tar, and combinations thereof.

5. A method for forming a hydrogen storage composition, comprising:
    forming a mixture of a source of hydrogen atoms and a receptor configured to receive spillover from the hydrogen source, wherein:
        the source of hydrogen atoms is a transition metal supported on an activated carbon support;
        the transition metal supported on the activated carbon support serves as the source via dissociation of hydrogen from the gas phase into the hydrogen atoms;
        the transition metal is chosen from platinum, palladium, ruthenium, rhodium, nickel, copper, iron, and combinations thereof; and
        the receptor is an activated carbon receptor;
    adding a precursor material to the mixture; and
    heating the mixture having the precursor material therein, thereby forming a carbon bridge between the source and the receptor.

6. The method as defined in claim 5 wherein the precursor material is a solid at room temperature, and wherein heating includes:
    increasing the precursor material to a predetermined melt temperature, thereby melting the precursor material and filling interstices between the source and the receptor; and
    increasing the predetermined melt temperature to form the carbon bridge.

7. The method as defined in claim 6 wherein increasing the predetermined melt temperature subjects the precursor material to at least partial carbonization.

8. The method as defined in claim 6 wherein the predetermined melt temperature is greater than a melting temperature of the precursor material.

9. The method as defined in claim 5 wherein the precursor material is a liquid at room temperature, and wherein heating includes increasing the mixture to a predetermined temperature, thereby subjecting the precursor material to at least partial carbonization.

10. The method as defined in claim 5 wherein the precursor material is selected from sugars, polymers, surfactants, cellulosic resins, coal tar, and combinations thereof.

11. The method as defined in claim 5 wherein heating is accomplished via a programmed temperature change process.

12. A method for storing hydrogen, comprising:
    forming a carbon bridge from a precursor material between a source of hydrogen atoms and a receptor configured to receive hydrogen from the source, wherein:
        the source of hydrogen atoms is a transition metal supported on an activated carbon support;
        the transition metal supported on the activated carbon support serves as the source via dissociation of hydrogen from the gas phase into the hydrogen atoms;
        the transition metal is chosen from platinum, palladium, ruthenium, rhodium, nickel, copper, iron, and combinations thereof; and
        the receptor is an activated carbon receptor; and
    dissociating hydrogen atoms from within the source, whereby the carbon bridge substantially enhances hydrogen spillover, thereby enhancing storage capacity.

13. The method as defined in claim 12, further comprising desorbing adsorbed hydrogen by exposing the receptor, source, and bridge to depressurization.

14. The method as defined in claim 12, further comprising desorbing adsorbed hydrogen by exposing the receptor, source, and bridge to a temperature of about 298 K in a vacuum for a predetermined time.

15. A method for improving contact between a hydrogen spillover source and a receptor, comprising:
   forming a mixture of the source and the receptor, wherein:
      the hydrogen spillover source is a transition metal supported on an activated carbon support;
      the transition metal supported on the activated carbon support serves as the source via dissociation of hydrogen from the gas phase into hydrogen atoms;
      the transition metal is chosen from platinum, palladium, ruthenium, rhodium, nickel, copper, iron, and combinations thereof; and
      the receptor is an activated carbon receptor;
   adding a precursor material to the mixture; and
   heating the mixture having the precursor material therein, thereby forming a carbon bridge between the source and the receptor.

16. The method as defined in claim 15 wherein the precursor material is a solid at room temperature, and wherein heating includes:
   increasing the precursor material to a predetermined melt temperature, thereby melting the precursor material and filling interstices between the source and the receptor; and
   increasing the predetermined melt temperature to form the carbon bridge.

17. The method as defined in claim 16 wherein increasing the predetermined melt temperature subjects the precursor material to at least partial carbonization.

18. The method as defined in claim 16 wherein the predetermined melt temperature is greater than a melting temperature of the precursor material.

19. The method as defined in claim 15 wherein the precursor material is a liquid at room temperature, and wherein heating includes increasing the mixture to a predetermined temperature, thereby subjecting the precursor material to at least partial carbonization.

* * * * *